(No Model.)
F. F. FOSTER.
SLED PROPELLER.
No. 359,504. Patented Mar. 15, 1887.
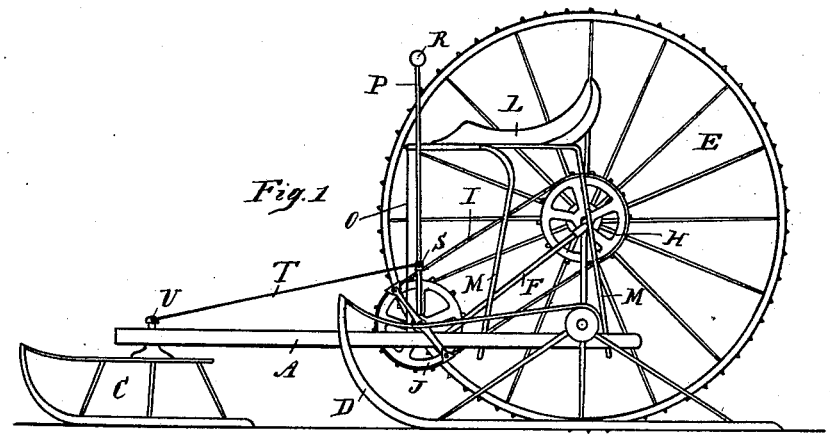
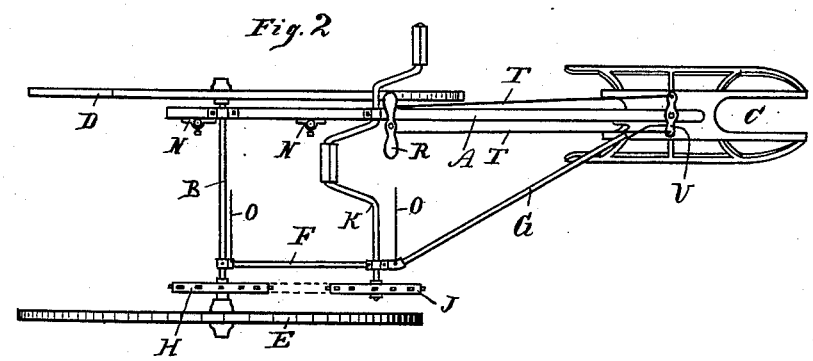
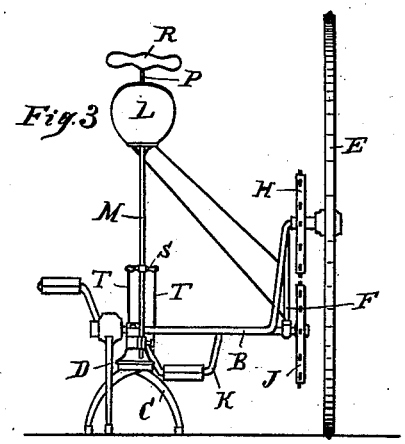
Attest:
John Schuman.
Edmond Scully.
Inventor:
Frank F. Foster.
by his Att'y
Tho. S. Sprague

UNITED STATES PATENT OFFICE.

FRANK F. FOSTER, OF MOUNT PLEASANT, MICHIGAN.

SLED-PROPELLER.

SPECIFICATION forming part of Letters Patent No. 359,504, dated March 15, 1887.

Application filed July 29, 1886. Serial No. 209,397. (No model.)

*To all whom it may concern:*

Be it known that I, FRANK F. FOSTER, of Mount Pleasant, in the county of Isabella and State of Michigan, have invented new and useful Improvements in Velocipede-Sleighs; and I do hereby declare that the following is a full, clear, and exact description thereof, reference being had to the accompanying drawings, which form a part of this specification.

This invention relates to certain new and useful improvements in the construction of velocipede-sleighs.

The invention consists in the peculiar construction, arrangement, and combination of the various parts, all as more fully hereinafter set forth.

Figure 1 is a side elevation of my improved velocipede-sleigh. Fig. 2 is a top plan of the same, and Fig. 3 is a rear elevation.

In the accompanying drawings, which form a part of this specification, A represents the main and longitudinal bed-piece of a frame, the rear end of such bed-piece being journaled upon the shaft B, while to the forward end of such bed-piece is secured, in any suitable manner, a sleigh, C, of any suitable construction. Upon one end of the axle B is secured a bob-runner, D, and upon the opposite end of such axle, which is bent substantially in the form shown in Fig. 3, is secured the drive-wheel E, the periphery or tire of which is spiked or studded, as shown.

F is a side bar of the supporting frame, the rear end of which is secured to the axle B, while its forward end is connected by the brace-rod G to or near the front end of the bed-piece, A, the whole of such frame preferably being made of gas-piping. The inner end of the hub of the main driving or traction wheel E is squared preferably, upon which is securely fastened a sprocket-wheel, H, from which the drive-chain I runs to a similar sprocket-wheel, J, secured upon the end of the treadle-shaft K, which latter is journaled in proper bearings across the rectangular portion of the supporting-frame, and by means of which motion is imparted to the drive-wheel.

L is the seat, which is secured upon suitable standards, M, vertically adjustable in brackets N, secured to the bed-piece A, the seat being braced by the rods O.

P is the stem of the hand-lever R. To this stem P are secured the crank-arms S, from which rods T lead to and connect with a similar crank-arm, U, suitably secured to the sleigh in any such manner that, by partially rotating or turning the stem P by means of the hand-lever R, the sleigh may readily be guided in the desired direction.

The operation of a device of this character is so well understood that it is not deemed necessary to enter into a description thereof.

What I claim as my invention is—

1. The combination, with the bed-piece A, journaled at its rear end on the axle B, and the sleigh C on the forward end of said bed-piece, of the bob-runner D on one end of said axle in line with said sleigh and the drive-wheel E on the other end, substantially as described.

2. The combination of the bed-piece A, journaled at its rear end on the axle B, the sleigh C on the forward end of said bed-piece, the bob-runner D on one end of said axle in line with said sleigh, the drive-wheel E on the other end of said axle, the side bar, F, and the diagonal brace-rods G, connecting said side bar with the front end of said bed-piece, substantially as described.

3. The combination, with the bed-piece, drive-wheel, sleigh, and bob-runner, of the lever R, having stem P, crank-arms S on said stem, the crank-arm U on said sleigh, and the rods T, connecting the crank-arms S U, substantially as and for the purpose specified.

4. The combination, with the bed-piece A, of the brackets N, secured thereto, the standards M, vertically adjustable in said brackets, the seat L, secured upon said standards, and the brace-rods O, substantially as described.

FRANK F. FOSTER.

Witnesses:
WM. T. WHITNEY,
E. J. VAN LEUVEN.